United States Patent
Han et al.

(10) Patent No.: US 11,216,206 B2
(45) Date of Patent: *Jan. 4, 2022

(54) METHOD OF OPERATING DATA STORAGE DEVICE

(71) Applicant: SAMSUNG ELECTRONCIS CO., LTD., Suwon-si (KR)

(72) Inventors: Il Su Han, Incheon (KR); Keun Soo Jo, Hwaseong-si (KR); Hee Chang Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 51 days.

This patent is subject to a terminal disclaimer.

(21) Appl. No.: 16/780,783

(22) Filed: Feb. 3, 2020

(65) Prior Publication Data

US 2020/0218466 A1 Jul. 9, 2020

Related U.S. Application Data

(63) Continuation of application No. 15/943,589, filed on Apr. 2, 2018, now Pat. No. 10,552,084, which is a
(Continued)

(30) Foreign Application Priority Data

Feb. 28, 2014 (KR) .......................... 10-2014-0023839

(51) Int. Cl.
*G06F 12/00* (2006.01)
*G06F 3/06* (2006.01)

(52) U.S. Cl.
CPC .......... *G06F 3/0652* (2013.01); *G06F 3/061* (2013.01); *G06F 3/0632* (2013.01); *G06F 3/0659* (2013.01); *G06F 3/0679* (2013.01)

(58) Field of Classification Search
CPC ...... G06F 3/0644; G06F 3/061; G06F 3/0607; G06F 21/85
See application file for complete search history.

(56) References Cited

U.S. PATENT DOCUMENTS 6,735,126 B1 5/2004 Nakagawa
6,778,443 B2 8/2004 Shiga et al.
(Continued)

FOREIGN PATENT DOCUMENTS

JP 2002170389 6/2002
JP 2005-092678 4/2005
(Continued)

OTHER PUBLICATIONS

Jedec Solid State Technology Association, Jedec Standard Universal Flash Storage (UFS), Version 2.0, Jun. 2012, (Year: 2012).*
(Continued)

*Primary Examiner* — Ryan Bertram
*Assistant Examiner* — Trang K Ta
(74) *Attorney, Agent, or Firm* — Volentine, Whitt & Francos, PLLC

(57) ABSTRACT

A method of operating a data storage device includes: receiving a single wipe device initialization command from a host, and in response to the wipe device initialization command, executing a wipe device initialization operation that during a single time period initializes the entirety of a mapping table defining logical partitions dividing memory space provided by a physical region of the data storage device.

22 Claims, 13 Drawing Sheets

Related U.S. Application Data continuation of application No. 14/532,109, filed on Nov. 4, 2014, now Pat. No. 9,933,974.

(56) References Cited

U.S. PATENT DOCUMENTS

| | | | |
|---|---|---|---|
| 8,447,920 B1 | 5/2013 | Syu | |
| 2003/0225962 A1* | 12/2003 | Hirosawa | G06F 21/79 711/103 |
| 2004/0098416 A1 | 5/2004 | Moore et al. | |
| 2007/0204098 A1 | 8/2007 | Eguchi et al. | |
| 2008/0140909 A1* | 6/2008 | Flynn | G06F 12/0246 711/100 |
| 2009/0157951 A1 | 6/2009 | Kontani | |
| 2010/0174850 A1* | 7/2010 | Chu | G06F 13/4234 711/103 |
| 2011/0145556 A1 | 6/2011 | Hakoun et al. | |
| 2011/0161560 A1 | 6/2011 | Hutchison et al. | |
| 2011/0264884 A1 | 10/2011 | Kim | |
| 2012/0011300 A1* | 1/2012 | Hung | G06F 12/0246 711/103 |
| 2012/0079289 A1 | 3/2012 | Weng et al. | |
| 2013/0036257 A1 | 2/2013 | Suda et al. | |
| 2013/0054980 A1 | 2/2013 | Frost et al. | |
| 2013/0086312 A1 | 4/2013 | Miura | |
| 2014/0095822 A1* | 4/2014 | Shiga | G06F 12/1441 711/163 |
| 2014/0164774 A1 | 6/2014 | Nord et al. | |
| 2015/0106556 A1 | 4/2015 | Yu et al. | |
| 2015/0169465 A1 | 6/2015 | Slepon | |
| 2016/0117245 A1 | 4/2016 | Vaisanen et al. | |

FOREIGN PATENT DOCUMENTS

| | | |
|---|---|---|
| JP | 2005-135544 | 5/2005 |
| KR | 10-0571915 | 4/2006 |
| KR | 1020080038936 A | 5/2008 |
| WO | WO 2014-006274 A1 | 1/2014 |

OTHER PUBLICATIONS

Korean Office Action dated Mar. 3, 2020, Corresponding to Korean Application No. KR 10-2014-0023839.

Jedec, Jedec Standard: Universal Flash Storage )UFS) Year: 2012).

Business Wire, Jedec Publishes Universal Flash Storage (UFS) Standard v2.0 Year: 2013).

* cited by examiner

METHOD OF OPERATING DATA STORAGE DEVICE

CROSS-REFERENCE TO RELATED APPLICATIONS

This is a Continuation of U.S. application Ser. No. 15/943,589, filed Apr. 2, 2018, now U.S. Pat. No. 10,552,084 issued on Feb. 4, 2020, which is a Continuation of U.S. application Ser. No. 14/532,109, filed Nov. 4, 2014, now U.S. Pat. No. 9,933,974 issued on Apr. 3, 2018, which claims priority under 35 U.S.C. § 119(a) to Korean Patent Application No. 10-2014-0023839 filed on Feb. 28, 2014, the subject matter of which is hereby incorporated by reference.

BACKGROUND

Embodiments of the inventive concept relate to methods of operating a data storage device, and more particularly, to methods of initializing mapping information between addresses associated with logical and physical addresses in response to a single initialization command provided by a host.

Various flash-based storage devices are widely used in universal serial bus (USB) flash drives, digital cameras, cellular phones, smartphones, tablet personal computers (PCs), memory cards, solid state drives (SSDs), etc. For ease of operation, the data storage space provided by a flash-based storage device is usually divided according to a number of logical partitions. Erase operations may be performed in units defined by these logical partitions in response to erase command(s) received from a host. Assuming there are 'N' logical partitions corresponding to 'N' physical regions of a flash-based storage device, a host will output an erase command 'N' times to the flash-based storage device in order to erase the entirety of the memory space provided by the flash-based storage device. Thus, where the memory space provided by a flash-based storage device is organized according to several hundred logical partitions, a controlling host will be required to output several hundred erase commands to the flash-based storage device in order to erase all of the memory space.

The so-called embedded multimedia card or eMMC is one type of flash-based storage device that logically divides its memory space according to a number of "logical partitions". Hence, in order to erase the entire flash memory area of an eMMC, multiple erase commands equal to the number of logical partitions must be issued from the host.

The so-called universal flash storage (UFS), another type of flash-based storage device divides its flash memory area according to a number of logical partitions commonly called "logical units". Hence, similar to the eMMC, in order to erase the entire flash memory area of a UFS, multiple commands equal to the number of logical units must be issued by the host.

From the foregoing examples of a broad class of flash-based storage devices, it may be understood that as the size of flash memory areas increases, and as the number of logical partitions or logical units increase accordingly, the time required to perform a "full erase" (i.e., the erasure of the entire memory space provide by the flash memory area) will also increase. Unfortunately, extended full erase times impair the overall operating capabilities of the constituent flash-based storage devices.

SUMMARY

Some embodiments of the inventive concept provide a method of operating a data storage device for increasing performance related with erasing by reducing time taken to erase an entire flash memory area and reducing the number of commands related with the erasing and a method of operating a system including the data storage device. In particular, some embodiments of the inventive concept provide a method of operating a data storage device for initializing all of mapping information between addresses of logical partitions and addresses of physical regions based on one initialization command output from a host and a method of operating a system including the data storage device.

According to some embodiments of the inventive concept, there is provided a method of operating a data storage device. The method includes receiving one initialization command from a host; and entirely initializing a mapping table, which defines relations between addresses of a physical region and addresses of logical partitions into which the physical region is logically divided, at a time based on the initialization command.

The method may further include erasing all data stored in the physical region based on the initialization command after entirely initializing the mapping table. The method may further include programming particular data to the physical region based on the initialization command after erasing all the data.

The method may further include transmitting a completion response indicating one among completion of the initialization, completion of the erasing, and completion of the programming to the host. The method may further include disabling a function of entirely initializing the mapping table based on the completion response. Alternatively, the method may further include receiving a setup bit from the host and storing the setup bit in a write-once memory (WOM) based on the completion response and disabling a function of entirely initializing the mapping table based on the setup bit stored in the WOM.

When the initialization command is a FORMAT UNIT command and the data storage device is a universal flash storage (UFS), the receiving the initialization command may include receiving the FORMAT UNIT command using a UFS device well-known logical unit.

Alternatively, the method may further include erasing all decryption keys, which are used to decrypt encrypted data stored in the physical region, based on the initialization command.

A computer program for performing the above-described method may be stored in a computer readable recording medium.

According to other embodiments of the inventive concept, there is provided a method of operating a system including an application processor and a data storage device. The method includes the data storage device receiving one initialization command from the application processor; and the data storage device performing at least one operation among an initialization operation of entirely initializing a mapping table, which defines relations between addresses of a physical region and addresses of logical partitions into which the physical region is logically divided, at a time and an erase operation of erasing all decryption keys, which are used to decrypt encrypted data stored in the physical region, based on the initialization command.

The at least one operation among the initialization operation and the erase operation may be performed based on at least one indication bit included in a command descriptor block (CDB) of a UFS protocol information unit (UPIU) output from the application processor.

The method may further include performing authentication using the application processor and the data storage device and transmitting the initialization command from the application processor to the data storage device after successfully completing the authentication.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTIONS

Figure 1:
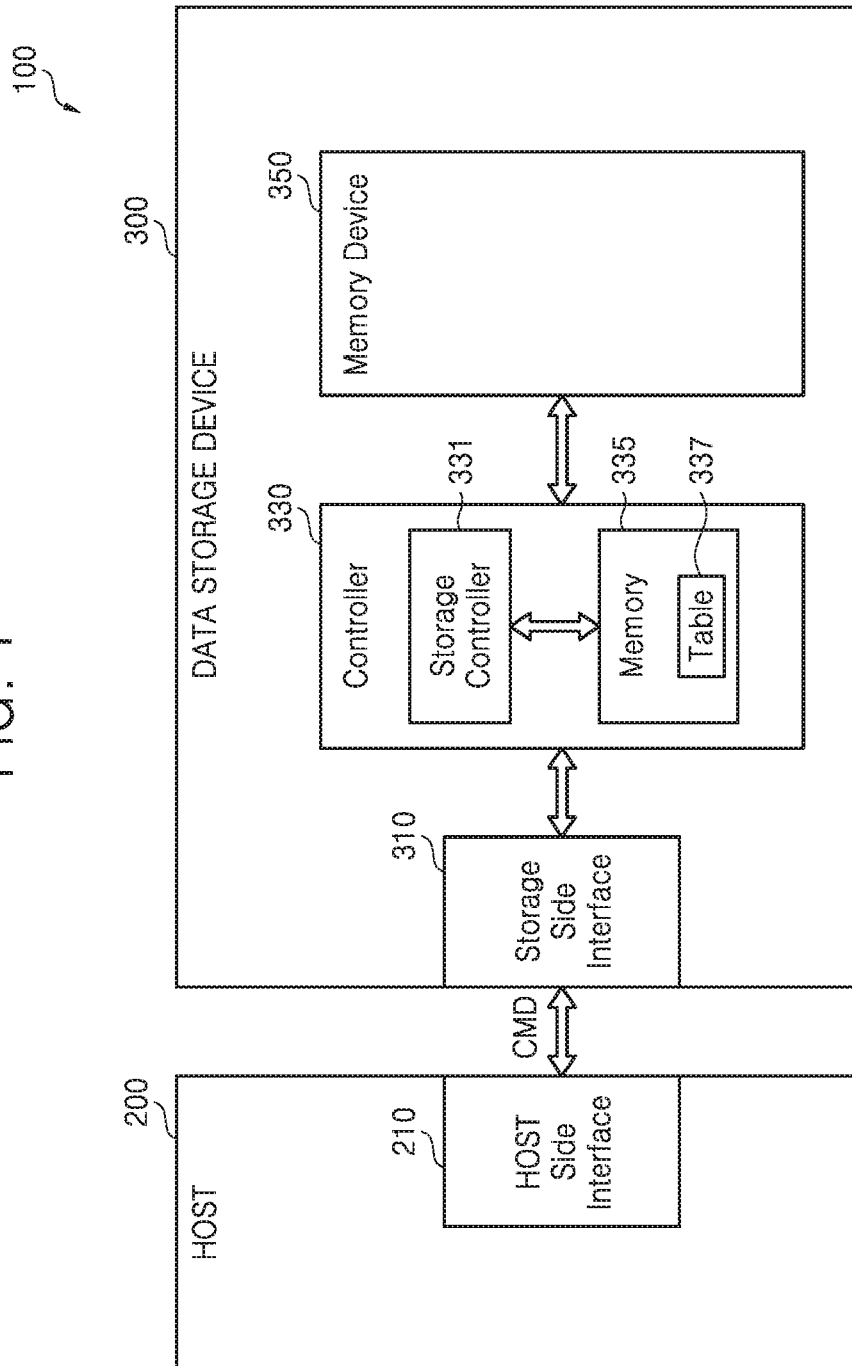
FIG. 1 is a block diagram of a data processing system according to certain embodiments of the inventive concept.

Certain embodiments of the inventive concept now will be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

In the context of certain embodiments of the inventive concept, the term "wipe device initialization operation" is used to denote an operation that may be used during the fabrication of data storage devices to entirely initialize a constituent mapping table. In this context, the wipe device initialization operation may be used to manage the logical partitions dividing the programmable memory space of a data storage device upon post-fabrication initialization. It will be further understood that the wipe device initialization operation is performed in response to a single wipe device command. Thus, the wipe device initialization operation may be understood as a single, "full erase" operation performed in response to a single corresponding command, rather than as a number of "partial erase" operations, each performed in response to a corresponding command.

In the context of other embodiments of the inventive concept, the term "wipe device erase operation" is used to denote an operation that may be used during normal operation of a data storage device to accomplish a full erase of all data presently stored by the data storage device. Here again, it will be understood that the wipe device erase operation is performed in response to a single wipe device command. This wipe device command may be the same as or different from the wipe device command used to execute the wipe device initialization operation described above. Thus, the wipe device erase operation may be understood as a single, "full erase" operation performed in response to a single corresponding command, rather than as a number of "partial erase" operations, each performed in response to a corresponding command.

In the context of still other embodiments of the inventive concept, the term "wipe device program operation" is used to denote an operation that may be used during testing of a data storage device, for example, to accomplish a full erase of all data presently stored by the data storage device followed by a full programming of the data storage device. Thus, a single wipe device program command may be issued by a connected host (e.g., a data storage device tester) in order to fully erase the entire programmable space of the data storage device following which the entire programmable space will be programmed with predetermined test data (e.g., all the same data values, or a prescribed pattern of test data). Here again, it will be understood that the wipe device program operation is performed in response to a single wipe device program command. Thus, the wipe device program operation may be understood as a single, "full erase" operation performed in response to a single corresponding command, rather than as a number of "partial erase" operations, each performed in response to a corresponding command.

Those skilled in the art will recognize that flash-based data storage devices are described in the Joint Electron Devices Engineering Council (JEDEC) standard related to universal flash storage (UFS) version 2.0 (i.e., JESD220B). This subject matter may be considered in the context of the inventive concept.

FIG. 1 is a block diagram of a data processing system 100 according to certain embodiments of the inventive concept. Referring to FIG. 1, the data processing system 100 generally includes a host 200 and a data storage device 300.

The data processing system 100 may be implemented as a personal computer (PC), a data server, a network-attached storage (NAS), or a portable electronic device. The portable device may be implemented as a laptop computer, a cellular phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), an internet of things (IoT) device, an internet of everything (IoE) device, a wearable computer, or an e-book.

The host 200 is one of a number of conventionally understood devices capable of controlling the operation of the data storage device 300, such as an integrated circuit (IC), a system on chip (SoC), an application processor (AP), a mobile AP, a test board, or a tester.

As noted above, at a particular stage of data storage device production, the host 200 may be used to communicate a single wipe device initialization command (generically indicated in FIGS. 1 and 2 as 'CMD') to the data storage device 300. In response, the data storage device 300 will initialize all of the mapping information stored in a mapping table 337. In the example shown in FIG. 1, the mapping table 337 is stored in a memory 335. Wherever stored in the data storage device 300, the mapping table 337 is used to manage the logical partitions dividing the memory space of device 350.

Thus, the data storage device 300 of FIG. 1 is configured to perform a wipe device initialization operation in response to a wipe device initialization command. As will be appreciated by those skilled in the art, the mapping information stored in the mapping table 337 is information defining relationships between "physical addresses" for the physical regions of the memory device 350 used to actually store data, and "logical addresses" for the logical partitions used to logically divide the physical memory space. (See, hereafter, the description presented in relation to FIGS. 3 and 4).

In certain embodiments of the inventive concept, the wipe device initialization command may be vendor specific, and/or uniquely associated with a vendor specific host used to initialize the data storage device 300. For example, a wipe device initialization command may include at least one vendor specific bit set defined by the vendor in a FORMAT UNIT command descriptor block as provided by JESD220B. In this regard, the wipe device initialization command may be processed by a UFS device, for example, as a conventionally understood logical unit as defined by JESD220B.

Accordingly, the wipe device initialization command may be used post-fabrication, or during some stage in the data storage device production as an "un-map command" of sorts capable of initially defining (or re-defining) the logical partition that will thereafter be used to manage the memory space of the data storage device. In this context, the wipe device initialization command may be understood not only as a full erase command directed to stored data, but also as an initial logical partition formatting command. Thus, the wipe device initialization command "un-maps" the entire physical memory space of the data storage device 300.

In contrast, certain conventional data storage devices use an un-map command to initialize only a part of the mapping information in the mapping table 337—the part defining logical partitions. That is, in certain conventional data storage devices, the un-map command is used to erase only the existing logical partition, while a separate "format unit command" must be used to format new logical partitions. Accordingly, assuming that the physical memory space of the memory device is divided by 'N' logical partitions, a host must issue 'N' erase commands followed by 'N' format unit commands to the data storage device in order to entirely erase and format the physical memory space.

Referring to FIG. 1, the host 200 and data storage device 300 may be connected using a variety of competent interfaces (e.g., a HOST side interface 210 and a Storage side interface 310). In combination, these interfaces 210 and 310 may be used to implement a universal handy interface (UHI) (i.e., UHS-I or UHS-II), a peripheral component interconnect-express (PCI-E) interface, an advanced technology attached (ATA), serial ATA (SATA), serial attached SCSI (SAS), or double data rate-x (DDRx) interface, for example.

The data storage device 300 may be implemented as a flash-based data storage device, such as a solid state drive (SSD), a universal serial bus (USB) flash drive, a UFS, a multimedia card (MMC), an embedded MMC (eMMC), etc.

In addition to the storage side interface 310, the data storage device 300 includes a controller 330, and a memory device 350. The controller 330 may be used to control the execution of read, write and/or erase operations with respect to the memory device 350. The controller 330 may be implemented as an IC or a SoC. In the example of FIG. 1, the controller 330 includes a storage controller 331 and memory 335. The storage controller 331 may be sued to generate mapping information defining relationships between physical and logical addresses, where the mapping information is stored in the memory 335 in the form of mapping table 337.

The memory 335 may be implemented as dynamic random access memory (DRAM) or static RAM (SRAM). Although the memory 335 is implemented within the controller 330 in the embodiments illustrated in FIG. 1, the memory 335 may be implemented external to the controller 330 in other embodiments.

Alternatively, the mapping information generated by the storage controller 331 may be stored in the memory device 350. For example, when the data processing system 100 is booted, the mapping information stored in the memory device 350 may be loaded from the memory device 350 to the memory 335 under the control of the storage controller 331. In various embodiments of the inventive concept, the storage controller 331 may include a central processing unit (CPU) that executes specialty software capable of managing relationships between the physical and logical addresses (e.g., a flash translation layer (FTL)).

As noted above, the data storage device 300 may entirely (re-)initialize at during one time period the mapping table 337 by execution of a wipe device initialization operation in response to a single wipe device initialization command provided by the host 200.

Figure 2:
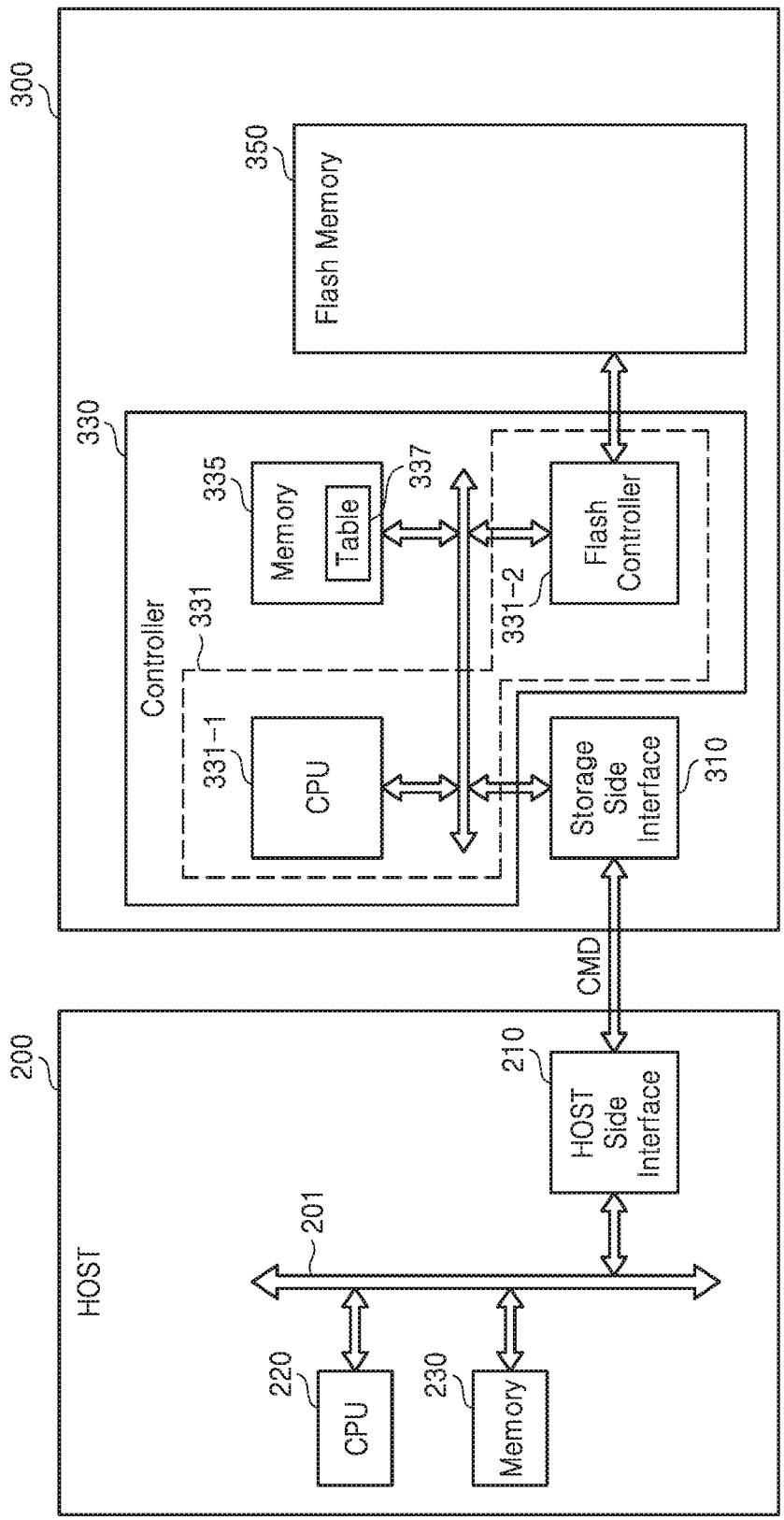
FIG. 2 is a somewhat more detailed block diagram of the data processing system of FIG. 1.

FIG. 2 is a somewhat more detailed block diagram of the data processing system 100 of FIG. 1. Referring to FIGS. 1 and 2, the host 200 is assumed to include the host side interface 210, a CPU 220, and a memory 230.

The CPU 220 may be used to generate and communicate a wipe device initialization command to the storage side interface 310 of the data storage device 300 via a bus 201 and the host side interface 210. The CPU 220 may be used to control the operation and interoperation of the host side interface 210, memory 230, and bus 201.

The memory 230 may be used, for example, to store programming code and/or data necessary to the operation of the host 200. Although a single memory 230 is shown in FIG. 2, the memory 230 may be implemented using a number of volatile memories (e.g., DRAM and/or SRAM) and/or non-volatile memories (read only memory (ROM) or flash memory).

Again in FIG. 2, the data storage device 300 is assumed to include the storage side interface 310, controller 330, and memory device 350. Hence, the host 200 and controller 330 may communicate (transmit and/or receive) commands, responses, and corresponding (read/write) data via one or more data communication protocols implemented by the interfaces 210 and 310. The memory device 350 may be implemented as flash-based memory (e.g., NAND-type flash memory and/or NOR-type flash memory).

The storage controller 331 of FIG. 2 includes a CPU 331-1 and a flash controller 331-2. Although only a single CPU 331-1 is illustrated in FIG. 2, the CPU 331-1 may be implemented by a first CPU that communicates with the host 200 and a second CPU that communicates with the flash controller 331-2.

Figure 3:
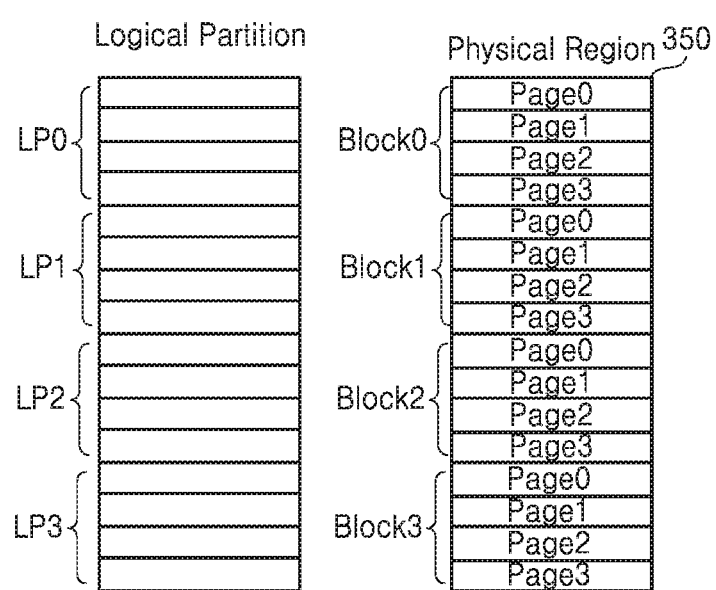
FIG. 3 is a conceptual diagram illustrating relationships between logical partitions and physical data storage regions.

Certain operating methods, or aspect of operations methods, according to various embodiments of the inventive concept are illustrated by the conceptual diagrams of FIGS. 3 and 4, as well as the operational diagrams of FIGS. 5, 6, 7, 8, 9, 10, 11, and 12 in the context of the data processing system 100 of FIG. 2 including the CPU 331-1. Thus, the CPU 331-1 is assumed to generate mapping information that defines relationships between logical addresses received from the host 200, for example, and physical addresses used to store data in the memory device 350. Here, mapping information defining such relationships between addresses of the physical region 350 and corresponding logical addresses defining logical partitions are assumed to be stored by mapping table 337 residing in the memory 335.

In FIG. 2, the memory 335 is shown internally disposed in relation to the controller 330. However, in other embodiments of the inventive concept, the mapping table 337 may be stored in the flash memory 350 under the control of the flash controller 331-2. Alternately, the memory 335 may be provided by an L1 data cache associated with the CPU 331-1.

FIG. 3 is a conceptual diagram illustrating in one example a set of relationships between logical partitions (and corresponding logical addresses) and physical regions of the flash memory 350 (and corresponding physical addresses). Referring to FIG. 3, the physical region (memory space) provided by the flash memory cell array of the flash memory 350 exemplarily includes four (4) blocks (e.g., Block0, Block1, Block2 and Block3), wherein each block respectively includes four (4) pages (e.g., Page0, Page1, Page2 and Page3). However, the physical region of the flash memory 350 is logically "viewed" by (e.g.,) a file system running on the host 200 as being divided by four (4) logical partitions (e.g., LP0, LP1, LP2 and LP3). Thus, in the simple example illustrated in FIG. 3, the logical partitions LP0 through LP3 logically correspond, one-for-one, with blocks Block0 through Block3.

Assuming that the data storage device 300 is implemented as a UFS, each logical partition shown in FIG. 3 will be a logical unit as defined by the JEDEC standard UFS version 2.0 (i.e., JESD220B). From a review of this widely available standard, the UFS may include one or more logical units and may support a maximum of eight (8) logical units. That is, in the context of the example illustrated in FIG. 3, the physical region of the flash memory 350 may be logically divided into up to a maximum of eight (8) logical units, although the physical region of the flash memory 350 is only divided into only four (4) logical partitions in the illustrated example.

In this regard, an eMMC or UFS designed and operated in accordance with the inventive concept may divide a physical region of a constituent flash memory into one or more logical partitions or logical units as required. Accordingly, such eMMC or UFS devices may perform erase operations according to logical partitions units, whereby data stored in a block of the physical region that corresponds to the logical partition unit identified by the erase operation may be physically erased. So, assuming that all of the logical partitions units are managed by a single mapping table, this mapping table must be updated each and every time an erase operation is performed. As a result, the overall performance of data storage device may deteriorate.

Figure 4A:
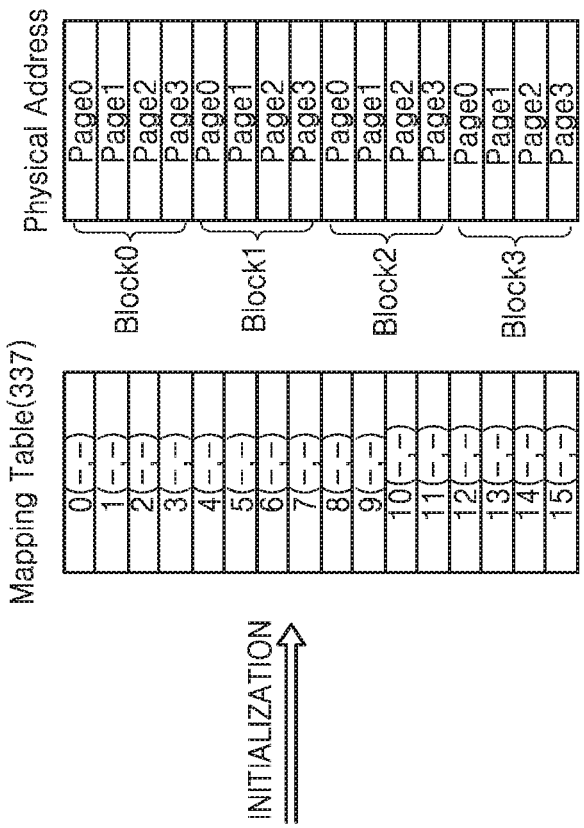
FIG. 4, inclusive of FIGS. 4A and 4B, is a conceptual diagram illustrating in one example a method of initializing a memory space mapping table.
Figure 4B:
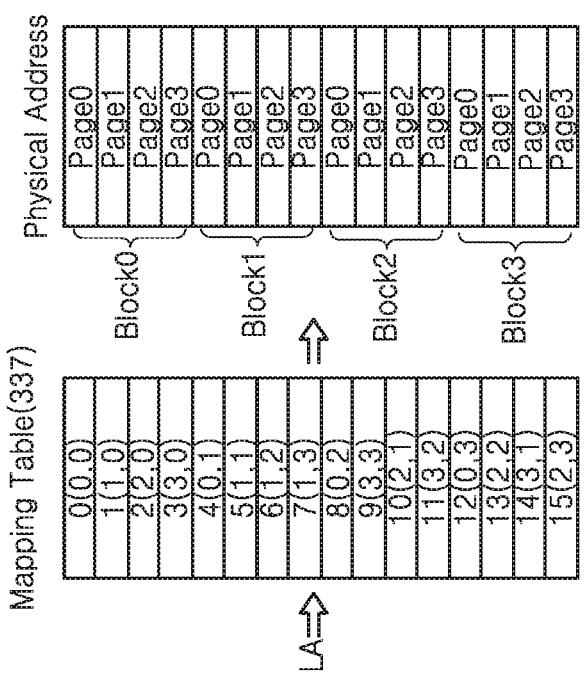

FIG. 4, inclusive of FIGS. 4A and 4B, is a conceptual diagram further illustrating a method of initializing the mapping table 337. Referring to FIGS. 3 to 4, even when all of logical partitions are managed using one mapping table 337, the data storage device 300 may entirely initialize the mapping table 337 in response to a single wipe device erase command. Therefore, unlike conventional data storage devices that require the execution of multiple erase operations, each directed to a different logical partition unit, a data storage device according to embodiments of the inventive concept may perform a full erase using a single wipe device erase operation without updating the mapping table 337 more than once.

Conventionally, when an erase operation is performed on the first logical partition LP0, a conventional data storage device copies data stored in each of the second through fourth pages Page1 through Page3 of the first block Block0 to a free page of at least one other block and then performs an erase operation on each of the first through fourth pages Page0 through Page3 of the first block Block0. At this time, the conventional data storage device must update mapping information of the first logical partition LP0. The updated mapping information indicates to which page of which block data stored in each of the second through fourth pages Page1 through Page3 has been copied.

However, in embodiments of the inventive concept, since the data storage device 300 is capable of entirely reinitializing the mapping table 337 at a time in response to a wipe device erase command, the data storage device 300 need not repeatedly update the mapping table 337, thereby wasting considerable time.

Rather, as illustrated in FIG. 4A, a reference character "LA" is assumed to denote a logical address. In a form of k(m,n) in the mapping table 337, "k" indicates the logical address LA, "m" indicates an address of a block, and "n" indicates an address of a page. At this time, "k" is ranged from 0 to 15, "m" is ranged from 0 to 3, and "n" is raged from 0 to 3. In a form of 10(2,1), "10" indicates the logical address and (2,1) indicates the page Page1 of the block Block2.

FIG. 4A shows the mapping table 337 before the mapping table 337 or mapping information stored in the mapping table 337 is fully re-initialized during a single wipe device erase operation, while FIG. 4B shows the mapping table 337 after the mapping table 337 or the mapping information stored in the mapping table 337 has been re-initialized using this approach.

Figure 5:
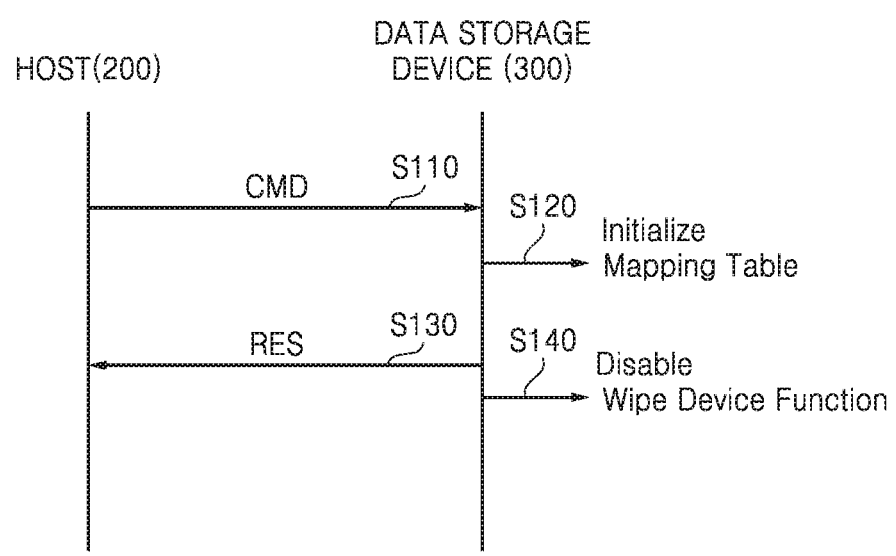
FIGS. 5, 6, 7, 8, 9, 10, 11 and 12 are respective operating diagrams illustrating in various examples exchanges of commands and/or responses in a data storage device like the ones shown in FIGS. 1 and 2 according to various embodiments of the inventive concept.

In relation to FIG. 5 it is assumed that the physical region of the memory device 350 in the data storage device 300 is logically divided into four logical partitions LP0 through LP3 and mapping of the four logical partitions LP0 through LP3 is managed using the mapping table 337. In addition, it is assumed that a wipe device initialization command is issued by a host during some stage of production for the data storage devices 300.

Referring now to FIGS. 1, 2, 3, 4 and 5, the host 200 first communicates the wipe device initialization command to the data storage device 300 (S110). Then, the controller 330 of the data storage device 300 initializes the mapping table 337 in response to the wipe device initialization command (S120). Such a re-initialization of logical partitions and erasure of stored data may be understood as a full "de-allocation" of memory space, as previously described in relation to FIG. 4.

In contrast, the host of a conventional data processing system must issue four (4) respective un-map commands to initialize the four logical partitions LP0 through LP3. However, certain embodiments of the inventive concept require the host 200 to issue only a single wipe device initialization command to the data storage device 300, whereupon the data storage device 300 will re-initialize all of the logical partitions LP0 through LP3 in one time period in response to the initialization command CMD, and may also (but need not necessarily) erase all stored data.

Following successful (re-)initialization, the controller 330 of the data storage device 300 will generate and communicate a completion response RES indicating completion of the (re-)initialization to the host 200 (S130). Thereafter, the controller 330 of the data storage device 300 may disable any further execution of the wipe device initialization operation (S140) upon communication of the completion response RES to the host 200 in order to prevent an misuse of this operation by a would-be hacker.

That is, since the function(s) performed by the wipe device initialization operation are legitimately used only during production of the data storage device 300, the controller 330 may register a corresponding command code associated with the wipe device initialization command as being invalid, or register a field supporting the wipe device initialization operation as being "reserved" once the completion response RES is generated or is communicated to the host 200 so that the wipe device initialization function may never be used once the data storage devices 300 is fully configured and shipped. In this regard, the wipe device initialization operation may one-time executed using firmware executed by the controller 330.

Figure 6:
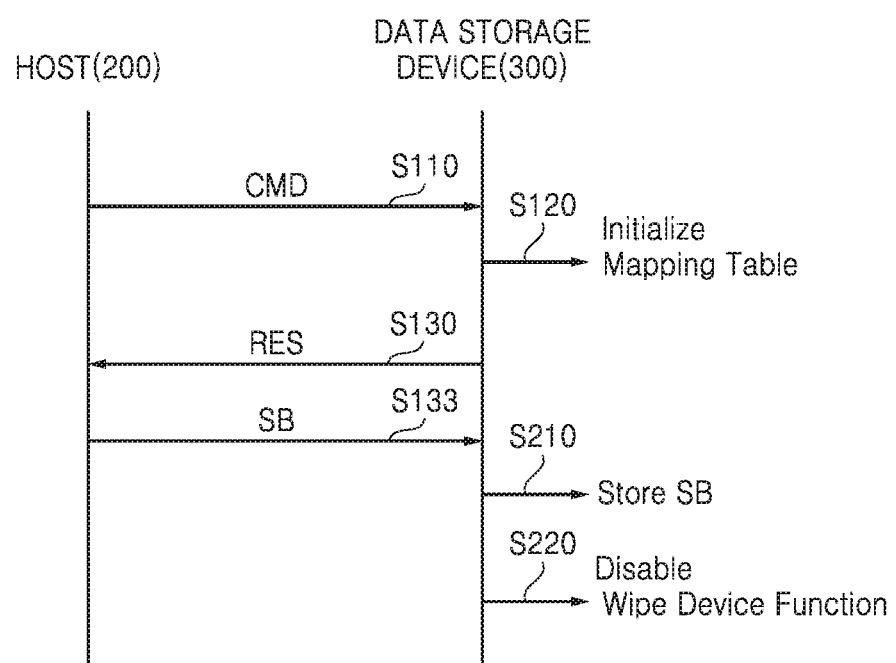

Referring now to FIGS. 2, 5 and 6, a variant on the foregoing wipe device initialization operation will be described. In FIG. 6, after the response RES has been communicated to the host 200 (S130), the host 200 communicates a given setup bit SB to the data storage device 300 in reply (S133). The setup bit SB may be stored, for example, in a write-once memory (WOM) under the control of the controller 330 (S210). Here, the term write-once memory or WOM is used to denote a memory or data storage circuit (e.g., a register) in which data once stored cannot be modified or erased. The WOM may be included in the memory 335. Then, the controller 330 may disable the wipe device initialization function (S220) as described above.

Figure 7:
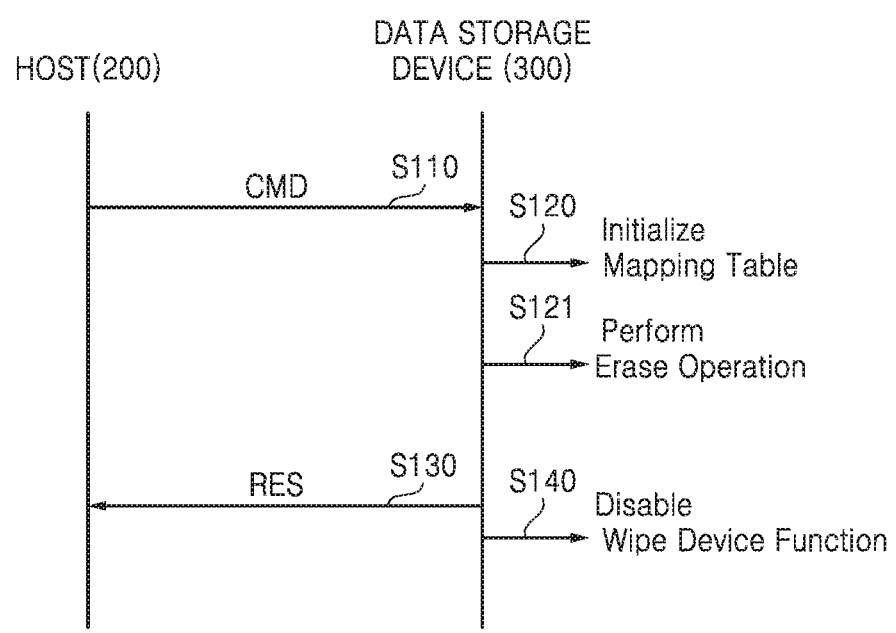
Figure 8:
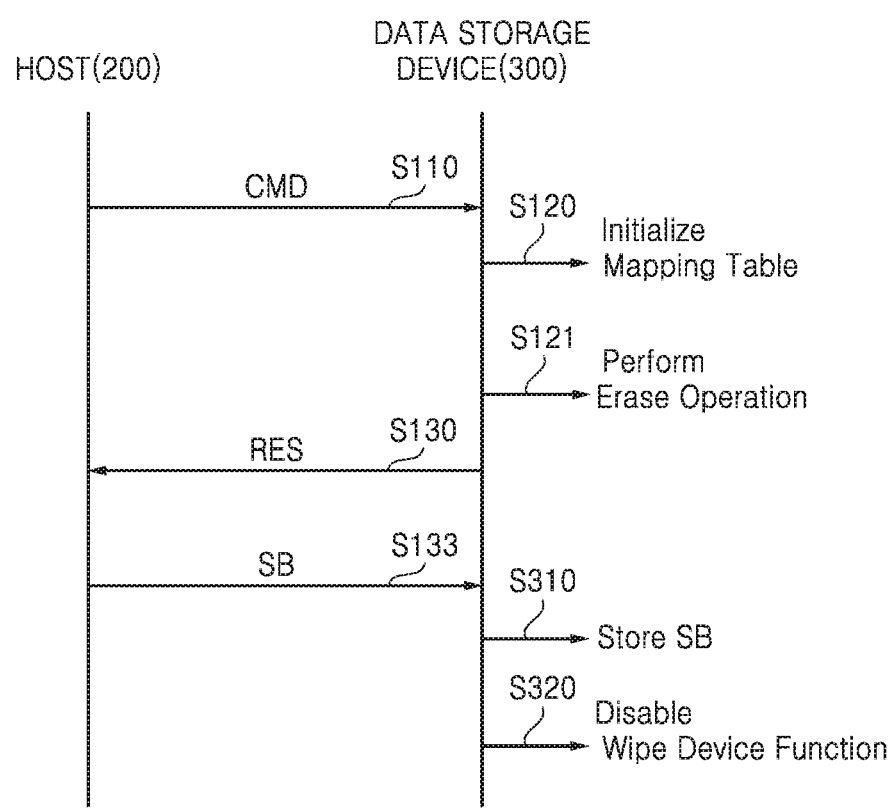

Referring now to FIGS. 2, 5 and 7, another variant of the wipe device initialization operation in relation to the mapping table 337 will be described. Here, after initializing the mapping table (S120), the controller 330 further performs a full erase of the entire physical region of the memory device 350 in response to the wipe device initialization command (S121). As a result, all data stored in the memory device 350 is erased. Since all of the data is erased from the memory device 350, any data residually stored in the memory device 350 during production or post-production testing may be erased, thereby preventing the potential loss of proprietary data (e.g., test programming, test patterns, programming code, etc.).

Once the full erase operation is successfully completed, the controller 330 generates a corresponding response RES indicating the completion of both the full erase operation and mapping table initialization to the host 200 (S130). Then, as before, the controller 330 may disable the wipe device initialization function (S140).

Referring now to FIGS. 2, 5, 6, 7 and 8, the host 200 may communicate the setup bit SB to the data storage device 300 (S133) in response to receipt of the response RES (S130). As previously described, the setup bit SB may be stored in a WOM under the control of the controller 330 (S310) and then the wipe device initialization function may be disabled (S320).

Referring now to FIGS. 2, 5, 7, and 9, after the full erase operation has been successfully completed (S121), the controller 330 may cause the programming of "specialty data" to the physical region of the memory device 350 in response to a wipe device program command (S123). The specialty data may be masking data or test data having a particular pattern (e.g., all-zero data, or all-ones data, or alternating block of zeros and ones).

Since the specialty data may be programmed to all or some of the physical region of the memory device 350 after execution of a full erase with respect to the physical region, no proprietary data stored in the physical region during production or post-production testing will be lost. Thereafter, once the full erase and program operation is successfully completed, the controller 330 may be used to generate a corresponding completion response RES (S130) and the controller 330 may disable the wipe device program function if used as part of an initialization routine for the data storage device 200 (S140).

Figure 9:
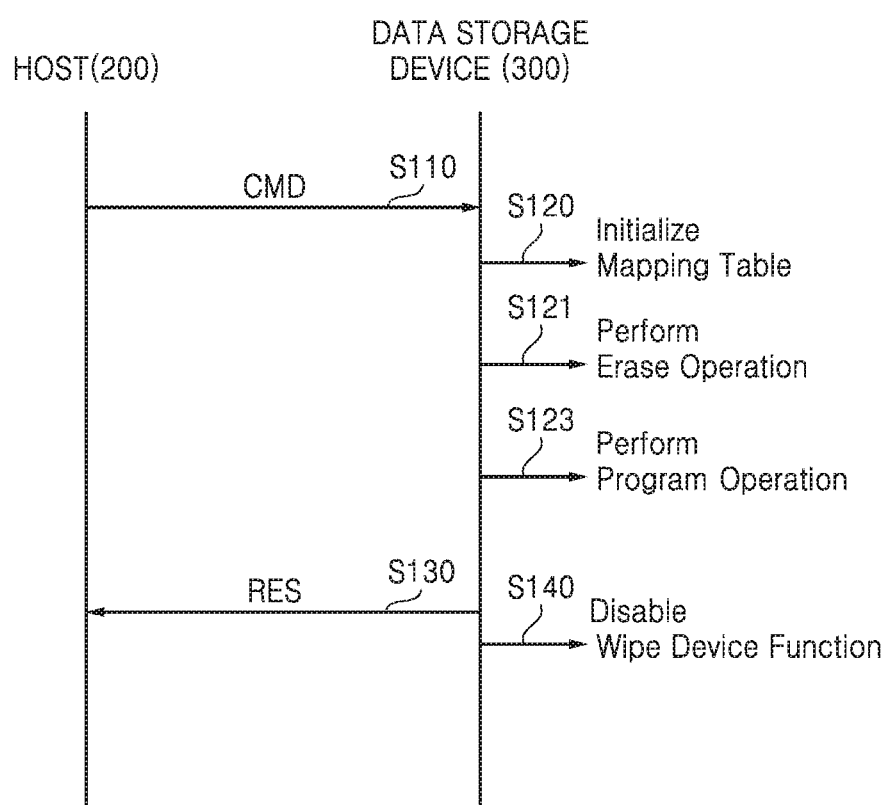
Figure 10:
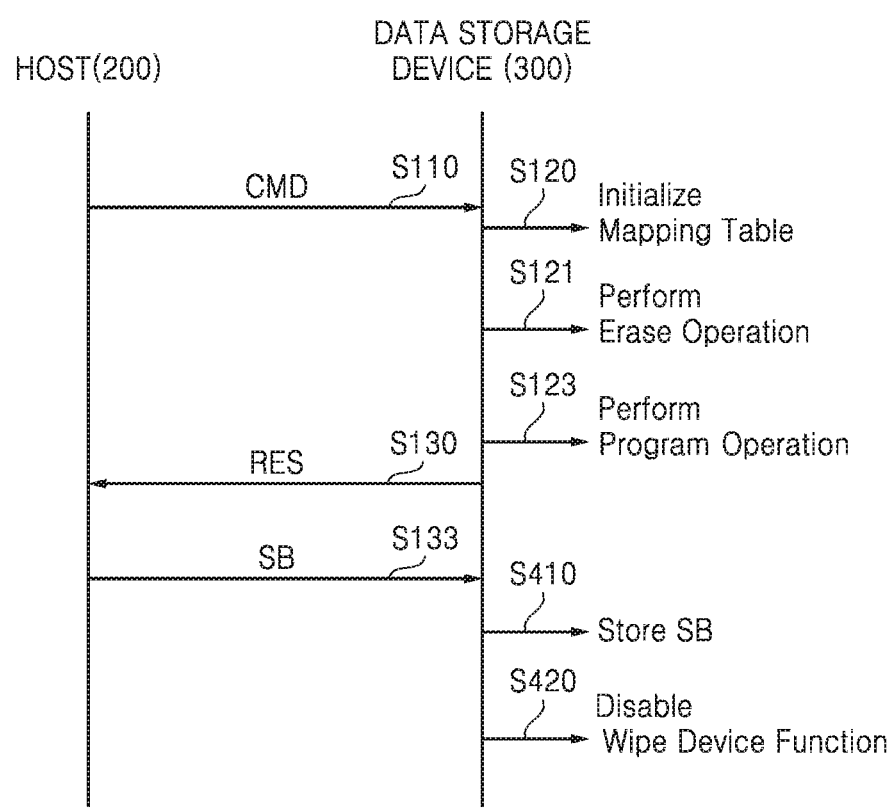

Referring now to FIGS. 2, 5, 6, 7, 9 and 10, the set bit (SB) return step is included with the method described in relation to FIG. 9.

Figure 11:
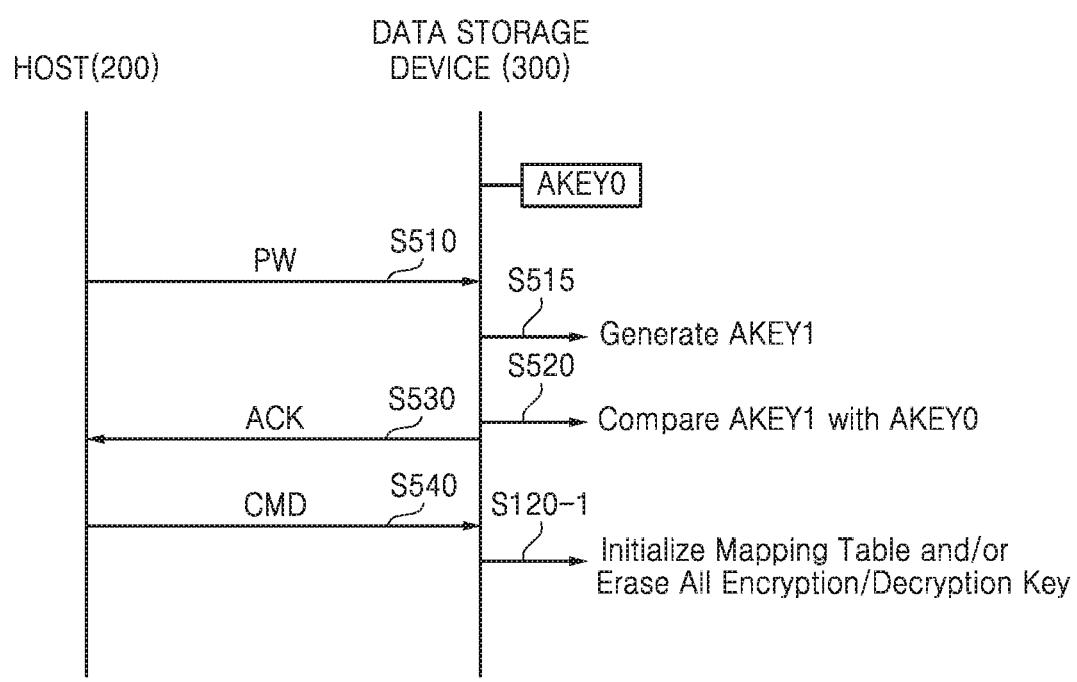

FIG. 11 is an operational diagram illustrating a method of operating the data processing system 100 of FIG. 1 or 2. Referring to FIGS. 5, 6, 7, 8, 9, 10 and 11, the host 200 may communicate information (e.g., a password or PW) used to generate a second authentication key (AKEY1) (S510). An encryption engine, which may be implemented in software and/or hardware components of the controller 330 or CPU-331-1, may be used to generate the second authentication key AKEY1 from the password PW (S515). For instance, the encryption engine may generate the second authentication key AKEY1 from the password PW using an encryption algorithm (S515).

Many competent encryption algorithms are conventionally understood and include the data encryption standard (DES), advanced encryption standard (AES), etc. In certain embodiments of the inventive concept, the encryption engine may be used to generate the second authentication key AKEY1 according to a hash function.

The controller 330 may then compare a first authentication key AKEY0 stored in the memory 335 with the second authentication key AKEY1 (S520). Only when the second authentication key AKEY1 is the same as the first authentication key AKEY0, will the controller 330 communicate a positive acknowledgement signal ACK to the host 200 (S530).

And only after receiving the positive acknowledgment signal ACK will the host 200 communicate a wipe device initialization command, a wipe device erase command, or a wipe device program command to the data storage device 300 (S540). Thereafter, the controller 330 will proceed as described above to initialize the mapping table 337 and/or erase stored data including stored encryption/decryption keys, etc. (S120-1).

In this manner, the encryption/decryption keys include encryption keys used to encrypt data to be stored in the memory device 350 and decryption keys used to decrypt encrypted data and collectively stored in the memory device 350 may be protected. For instance, when a wipe device initialization command includes a command descriptor block (CDB) of a UFS protocol information unit (UPIU) and the CDB includes at least one indication bit, the controller 330 may perform at least one operation among the operation of initializing the mapping table 337 and the operation of erasing all of the encryption/decryption keys based on the at least one indication bit in operation S120-1.

When all of the encryption/decryption keys are erased, the encrypted data stored in the memory device 350 cannot easily be decrypted, and therefore, the host 200 cannot decrypt the encrypted data even when receiving the encrypted data.

In the context of FIG. 11, the controller 330 may also perform a full erase operation (S121) and/or a following program operation (S123), as described with reference to FIGS. 5, 6, 7, 8, 9 and 10. In addition, the controller 330 may communicate corresponding completion response(s) to the host 200 (S130) and/or disable various wipe device functions (e.g., S140, S220, S320, and S420).

Figure 12:
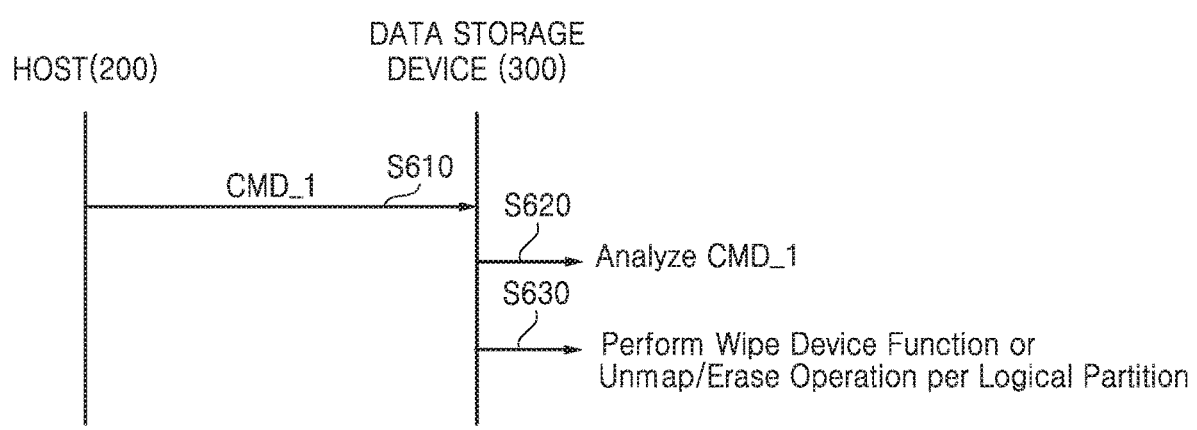

FIG. 12 is another operational diagram illustrating a method of operating the data storage device 300 of FIG. 1 or 2. Referring to FIG. 12, the host 200 is assumed to communicate some type of command (CMD_1) to the data storage device 300 (S610). The controller 330 then analyzes the type and nature of the command (S620) and performs the indicated operation (S630).

For example, should the command be a wipe device initialization command that is received after the wipe device initialization function has been disabled, the controller 330 will not execute it. In this regard, the controller 330 may simply ignore the second-received wipe device initialization command, or return an error message along with refusing to execute the wipe device initialization command.

Alternately, if the received command is a conventional un-map command altering an existing logical partition, the controller 330 may perform a corresponding un-map operation on the logical partition in response to the un-map command. Here, the un-map operation is not an operation that entirely re-initializes the mapping table 337, but rather is an operation that re-initializes fewer than all of the existing logical partitions. Further, the un-map operation does not cause data to be erased from an indicated block in the physical region of the memory device 350 corresponding to the logical partition.

In contrast to the foregoing, if the received command is a conventional erase command directed a logical partition, the controller 330 will simply perform a conventional erase operation directed to data identified with the logical partition. Here, the erase operation is not a full erase operation that erases the entirety of the physical region of the memory device 350.

As described above, since a wipe device initialization operation may be performed during production of the data storage device 300 or during post-production testing, certain proprietary data used during testing and/or production may be better safeguarded an with dramatically improved performance over the use of multiple un-map and erase commands.

Figure 13:
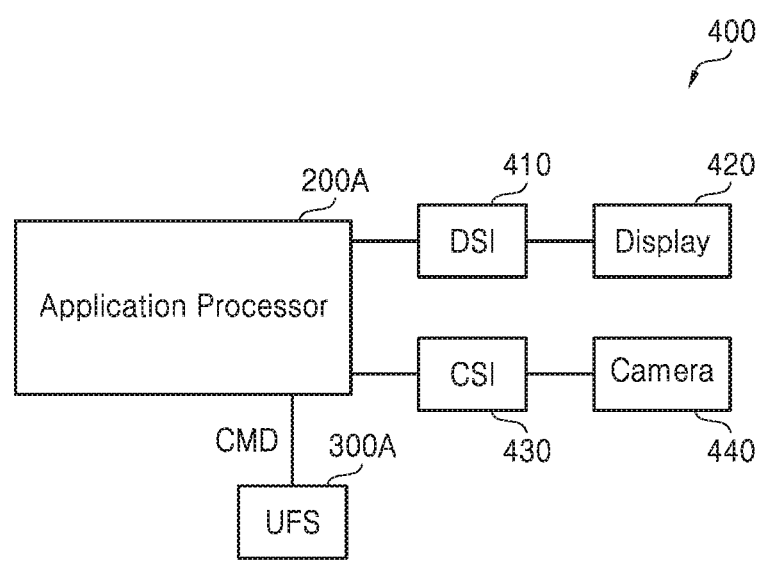
FIG. 13 is a block diagram of an electronic system that may incorporate the data processing system of FIG. 1 or FIG. 2.

FIG. 13 is a block diagram of an electronic system 400 including the data processing system 100 illustrated in FIG. 1. Referring to FIG. 13, the electronic system 400 may be implemented as the portable electronic device described with reference to FIG. 1. For instance, the electronic system 400 may be implemented as a portable electronic device complying with a mobile industry process interface (MIPI®) standard.

The electronic system 400 may include an AP 200A that functions as the host 200, a data storage device 300A, a display serial interface (DIS) 410, a display 420, a camera serial interface (CIS) 430, and a camera 440. The data storage device 300A may be implemented as a UFS.

The AP 200A may transmit the initialization command CMD to the UFS 300A. At this time, the UFS 300A may entirely initialize the mapping table 337 and/or erase all of the encryption/decryption keys, as described with reference to FIGS. 5 through 12. In other words, the UFS 300A may perform the wipe device function according to different embodiments of the inventive concept. The AP 200A may transmit display data to the display 420 through the DSI 410. The camera 440 may transmit image data to the AP 200A through the CSI 430.

As described above, according to embodiments of the inventive concept, mapping information defining relationships between physical and logical address may be one-time and entirely initialized in response to a single wipe device initialization command output from a host. In addition, the entire physical region may be erased in response to this wipe device initialization command.

Since the mapping information is entirely initialized during one defined time period, even when logical partitions related with the physical region are managed using one mapping table and each of the logical partitions is erased, the mapping table does not need to be repeatedly updated. As a result, time required to update the mapping table is reduced.

According to other embodiments of the inventive concept, the number of times that a command related with erasure of the logical partitions is output to a data storage device in a system is reduced. Moreover, time taken for a test during the mass production of data storage devices is also reduced.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating a data storage device including a controller and a memory device, the method comprising:
   receiving in the controller a wipe device operation request from a host; and
   in response to the wipe device operation request, executing a wipe device operation,
   wherein the data storage device is a universal flash storage (UFS) device, and the UFS device receives a FORMAT UNIT command by using a Device well known logical unit, and the UFS device executes the wipe device operation based on the FORMAT UNIT command, wherein the FORMAT UNIT command requests the data storage device to format all logical units of the memory device, wherein the FORMAT UNIT command sent to the Device well known logical unit requests the data storage device to format all of the logical units of the memory device, and wherein the Device well known logical unit is addressed by a W-LUN (well known logical unit number).

2. The method of claim 1, wherein the Device well known logical unit provides UFS device level interaction.

3. The method of claim 1, wherein the wipe device operation is fulfilled issuing the FORMAT UNIT command to all of the logical units of the memory device.

4. The method of claim 3, wherein, if a logical unit of the logical units of the memory device is write protected, the FORMAT UNIT command fails and a content of a storage area corresponding to the logical unit is not altered.

5. The method of claim 1, wherein the FORMAT UNIT command includes at least one vendor specific bit defined by a vendor in a FORMAT UNIT command descriptor block.

6. The method of claim 1, wherein the wipe device operation includes initializing an entirety of a mapping table to remove mapping information during a single time period,
wherein the mapping information defines relationships between physical addresses for physical regions of the memory device and logical addresses for logical partitions used to logically divide physical memory space of the memory device.

7. The method of claim 6, wherein the wipe device operation further includes, in response to the wipe device operation request, programming specialty data in the physical regions after erasing all of existing data stored in the physical regions.

8. The method of claim 7, wherein the specialty data is one of all-zeros, all-ones, and a pattern of all-zeros and all-ones.

9. The method of claim 6, wherein the wipe device operation further includes, in response to the wipe device operation request, erasing all existing data stored in the physical regions of the memory device without updating the mapping table more than once after initializing the entirety of the mapping table.

10. The method of claim 7, wherein the existing data comprises all decryption keys used to decrypt encrypted data stored in the physical regions.

11. A data storage device comprising:
a memory device including a plurality of storage areas; and
a controller configured to
receive a wipe device operation request from a host, and
in response to the wipe device operation request, execute a wipe device operation,
wherein the data storage device is a universal flash storage (UFS) device, and the UFS device receives a FORMAT UNIT command by using a Device well known logical unit, and the UFS device executes the wipe device operation based on the FORMAT UNIT command,
wherein the FORMAT UNIT command requests the data storage device to format all logical units of the memory device,
wherein the FORMAT UNIT command sent to the Device well known logical unit requests the data storage device to format all of the logical units of the memory device, and
wherein the Device well known logical unit is addressed by a W-LUN (well known logical unit number).

12. The data storage device of claim 11, wherein the Device well known logical unit provides UFS device level interaction.

13. The data storage device of claim 11, wherein the wipe device operation is fulfilled issuing the FORMAT UNIT command to all of the logical units of the memory device.

14. The data storage device of claim 13, wherein, if a logical unit of the logical units of the memory device is write protected, the FORMAT UNIT command fails and a content of a storage area corresponding to the logical unit is not altered.

15. The data storage device of claim 11, wherein the wipe device operation includes initializing an entirety of a mapping table to remove mapping information during a single time period,
wherein the mapping information defines relationships between physical addresses for physical regions of the memory device and logical addresses for logical partitions used to logically divide physical memory space of the memory device.

16. The data storage device of claim 15, wherein the wipe device operation further includes, in response to the wipe device operation request, programming specialty data in the physical regions after erasing all of existing data stored in the physical regions.

17. The data storage device of claim 15, wherein the wipe device operation further includes, in response to the wipe device operation request, erasing all existing data stored in the physical regions of the memory device without updating the mapping table more than once after initializing the entirety of the mapping table.

18. A data storage device comprising:
a memory device including a plurality of storage areas; and
a controller configured to
receive a wipe device operation request from a host, and
in response to the wipe device operation request, execute a wipe device operation,
wherein the data storage device is a universal flash storage (UFS) device, and the UFS device receives a FORMAT UNIT command, and the UFS device executes the wipe device operation based on the FORMAT UNIT command,
wherein the FORMAT UNIT command sent to a Device well known logical unit requests the data storage device to format all logical units of the memory device, and
wherein the Device well known logical unit is addressed by a W-LUN (well known logical unit number).

19. The data storage device of claim 18, wherein the wipe device operation is fulfilled issuing the FORMAT UNIT command to all of the logical units of the memory device.

20. The data storage device of claim 19, wherein, if a logical unit of the logical units of the memory device is write protected, the FORMAT UNIT command fails and a content of a storage area corresponding to the logical unit is not altered.

21. The data storage device of claim 18, wherein the wipe device operation includes initializing an entirety of a mapping table to remove mapping information during a single time period,
wherein the mapping information defines relationships between physical addresses for physical regions of the memory device and logical addresses for logical partitions used to logically divide physical memory space of the memory device.

22. The data storage device of claim 21, wherein the wipe device operation further includes, in response to the wipe device operation request, programming specialty data in the physical regions after erasing all of existing data stored in the physical regions.

* * * * *